(12) United States Patent
Amanullah et al.

(10) Patent No.: US 10,494,884 B2
(45) Date of Patent: Dec. 3, 2019

(54) USED AUTOMOBILE TIRES AS LOSS CIRCULATION MATERIAL

(71) Applicant: Saudi Arabian Oil Company, Dhahran (SA)

(72) Inventors: Md Amanullah, Dhahran (SA); Mohammed K. Arfaj, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/000,415

(22) Filed: Jun. 5, 2018

(65) Prior Publication Data

US 2019/0119546 A1   Apr. 25, 2019

Related U.S. Application Data

(60) Provisional application No. 62/532,629, filed on Jul. 14, 2017.

(51) Int. Cl.
| | |
|---|---|
| *E21B 33/138* | (2006.01) |
| *E21B 21/00* | (2006.01) |
| *C09K 8/035* | (2006.01) |
| *B29B 17/04* | (2006.01) |
| *C09K 8/487* | (2006.01) |
| *B29B 17/00* | (2006.01) |
| *B29L 30/00* | (2006.01) |

(52) U.S. Cl.
CPC ........ *E21B 21/003* (2013.01); *B29B 17/0412* (2013.01); *C09K 8/035* (2013.01); *C09K 8/487* (2013.01); *E21B 33/138* (2013.01); *B29B 2017/0015* (2013.01); *B29B 2017/0424* (2013.01); *B29L 2030/00* (2013.01); *C09K 2208/08* (2013.01)

(58) Field of Classification Search
None
See application file for complete search history.

(56) References Cited

U.S. PATENT DOCUMENTS

| | | | |
|---|---|---|---|
| 5,253,709 A | 10/1993 | Kendrick et al. | |
| 6,045,070 A | * 4/2000 | Davenport | ............... B02C 7/04 175/206 |
| 6,605,570 B2 | 8/2003 | Miller et al. | |
| 6,881,708 B2 | 4/2005 | Reddy et al. | |
| 7,066,285 B2 | 6/2006 | Shaarpour | |
| 8,043,997 B2 | 10/2011 | Whitfill et al. | |
| 8,613,319 B2 | 12/2013 | Sodhi | |

(Continued)

FOREIGN PATENT DOCUMENTS

WO   2010142370   12/2010

OTHER PUBLICATIONS

AlAwad et al., "Utilization of shredded waste car tyres as a fracture seal material (FSM) in oil and gas drilling operations," Journal of Petroleum and Gas Engineering, vol. 8, No. 3, May 30, 2017, 8 pages.

(Continued)

*Primary Examiner* — Andrew Sue-Ako
(74) *Attorney, Agent, or Firm* — Fish & Richardson P.C.

(57) ABSTRACT

An automobile tire that is unsuitable to carry an automobile is obtained. Tire chips are formed from the obtained automobile tire. The tire chips are mixed with a quantity of wellbore carrier fluid to form a mixture. The mixture is used as loss circulation material during a wellbore drilling operation.

9 Claims, 4 Drawing Sheets

(56) References Cited

U.S. PATENT DOCUMENTS

| | | | |
|---|---|---|---|
| 8,726,990 B2 | 5/2014 | Karcher et al. | |
| 9,366,098 B2 | 6/2016 | Wu | |
| 2005/0113260 A1* | 5/2005 | Wood .................... | C09K 8/035 507/117 |
| 2005/0217852 A1* | 10/2005 | Bennett .................. | C09K 8/035 166/292 |
| 2006/0035790 A1 | 2/2006 | Okell et al. | |
| 2006/0213663 A1* | 9/2006 | Vargo, Jr. ............... | C09K 8/032 166/292 |
| 2009/0266541 A1* | 10/2009 | Reynolds ................ | C10B 47/02 166/272.6 |
| 2010/0181073 A1 | 7/2010 | Dupriest et al. | |
| 2015/0008044 A1* | 1/2015 | Fontenot ................ | C09K 8/035 175/72 |
| 2015/0275607 A1 | 10/2015 | Kraemer et al. | |
| 2016/0168443 A1 | 6/2016 | Lafite et al. | |
| 2016/0312102 A1 | 10/2016 | Witfill et al. | |

OTHER PUBLICATIONS

Aljaaidi et al., "Used tires recycling and utilization in Saudi Arabia," retrieved from the Internet: URL: http://fac.ksu.edu.sa/sites/default/files/final_reporrt_.pdf, retrieved on Oct. 1, 2018, published May 1, 2014, 229 pages.

International Search Report and Written Opinion issued in International Application No. PCT/US2018/041305 dated Oct. 11, 2018, 14 pages.

Cook et al., "Stabilizing the Wellbore to Prevent Lost Circulation," Oilfield Review, vol. 23, No. 4, Winter 2011, 10 pages.

* cited by examiner

USED AUTOMOBILE TIRES AS LOSS CIRCULATION MATERIAL

TECHNICAL FIELD

This disclosure relates to minimizing loss of wellbore fluids into formations using loss circulation materials, for example, eco-friendly loss circulation materials.

BACKGROUND

To form a wellbore into a geologic formation, a drill bit pulverizes a path through the geological formation. During the drilling process, drilling fluid is circulated to cool and lubricate the bit, remove the pulverized pieces of the formation (also known as "cuttings"), and maintain a static pressure on the reservoir formation. In some instances, during the drilling process, a high-loss zone can be encountered. A high-loss zone is a zone in which drilling circulation fluid is lost from the wellbore to the geologic formation. Circulation fluid can be expensive and is normally recirculated through the wellbore continuously. When circulation is lost to the geologic formation in the high-loss zone, more circulation fluid is often added. In addition, the loss of fluid reduces the static pressure on the geologic formation. Such a loss in pressure can result in a "kick", or a pressurized release of hydrocarbons from the wellbore. When a high-loss formation is encountered, loss control materials can be added to the drilling circulation fluid to plug the high-loss zone. The loss control material is able to plug the high-loss zone by becoming lodged within the pores and fractures located in the walls of the wellbore.

SUMMARY

This specification describes technologies relating to used automobile tires as loss circulation materials.

An example implementation of the subject matter described within this disclosure is a method with the following features. An automobile tire that is unsuitable to carry an automobile is obtained. Tire pieces are formed from the obtained automobile tire. The tire pieces are mixed with a quantity of wellbore carrier fluid to form a mixture. The mixture is used as loss circulation material during a wellbore drilling operation.

Aspects of the example implementation, which can be combined with the example implementation alone or in combination, include the following. Using the mixture as loss circulation material during the wellbore drilling operation includes flowing the mixture into a wellbore being drilled during the wellbore drilling operation. The tire pieces at least partially seal loss circulation zones in a formation in which the wellbore is being drilled.

Aspects of the example implementation, which can be combined with the example implementation alone or in combination, include the following. The quantity of wellbore carrier fluid includes water, bentonite, soda ash, or sodium hydroxide.

Aspects of the example implementation, which can be combined with the example implementation alone or in combination, include the following. After obtaining the automobile tire, the obtained automobile tire is cleaned.

Aspects of the example implementation, which can be combined with the example implementation alone or in combination, include the following. Forming the tire pieces includes shredding the cleaned automobile tire to form tire chips. At least some of the tire chips are larger than at least some of the tire pieces.

Aspects of the example implementation, which can be combined with the example implementation alone or in combination, include the following. The tire chips are granulated into the plurality of tire pieces.

Aspects of the example implementation, which can be combined with the example implementation alone or in combination, include the following. Granulating the tire chips includes removing steel and fiber in the automobile tire.

Aspects of the example implementation, which can be combined with the example implementation alone or in combination, include the following. The steel is removed magnetically.

Aspects of the example implementation, which can be combined with the example implementation alone or in combination, include the following. The fiber is removed using a combination of shaking screens and wind sifters.

The details of one or more implementations of the subject matter described in this specification are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
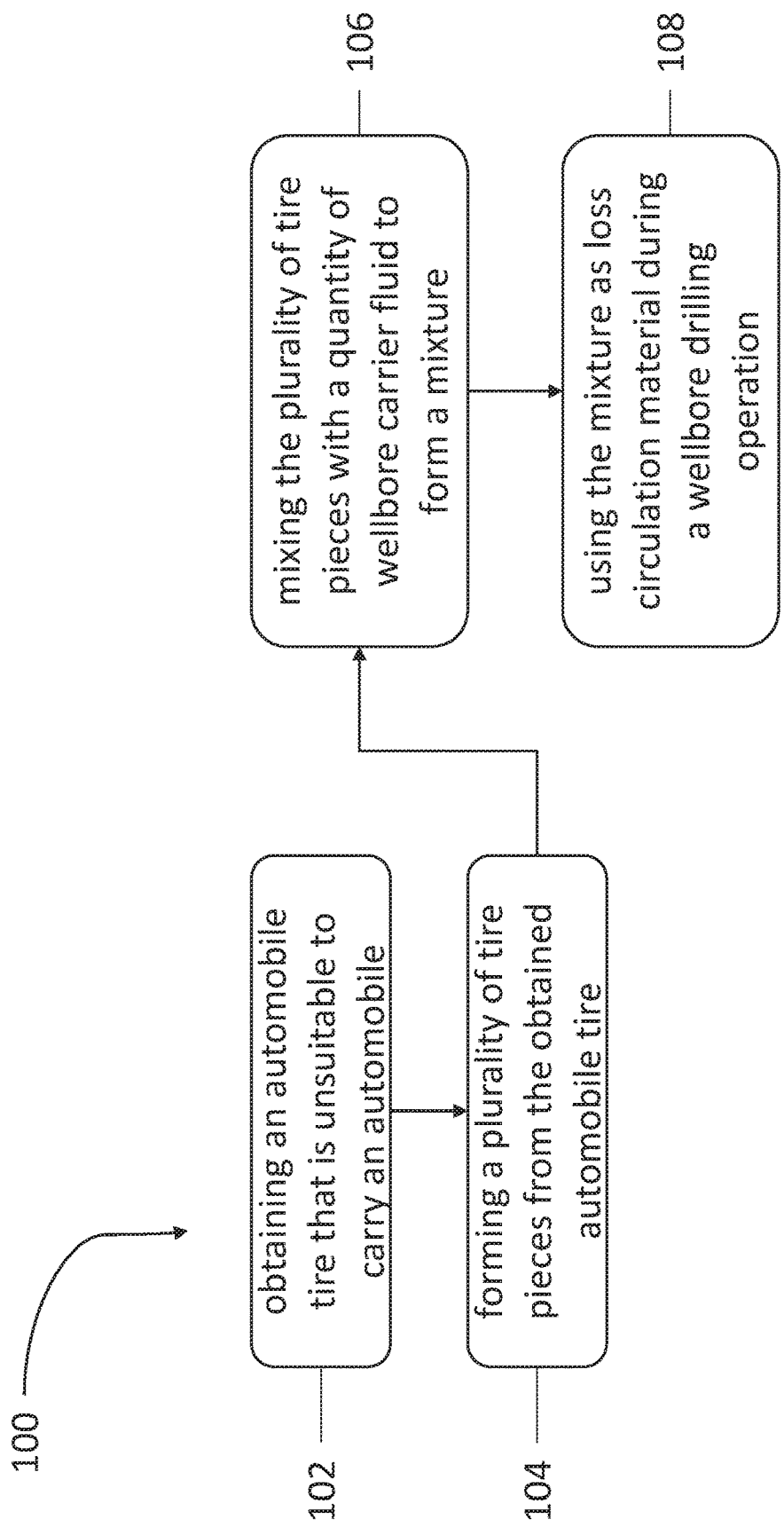
FIG. 1 is a flowchart of an example method that can be used to recycle tires into loss circulation material.

When encountering a high-loss zone, a large volume of drilling fluid can be lost into the geologic formation accompanied by a quick reduction of the fluid column within the wellbore. The drop of fluid column can trigger various drilling problems such as stuck pipe, wellbore instability, a kick, or a blowout, all of which can lead to side tracking or abandonment of a well. The possibility of causing various drilling problems increases with delay in controlling the loss of circulation fluid condition. Loss control materials (LCMs) can be used to mitigate the loss of drilling fluid when a high-loss zone is encountered during drilling operations. LCMs can include particulates or hydratable fluids to block off the high-loss zone. Particulates block the high-loss zone by becoming trapped within rock-pores and fractures along the wellbore wall through which the drilling fluid passes into the geologic formation. Effective control of the loss of whole fluid requires the deposition of a resilient, stable, and tight seal that can maintain integrity and stability during changing in-situ stress conditions. For example depleted reservoir conditions, varying tectonic conditions, fluctuating operating conditions under increased surge and swabbing pressures, and many other downhole conditions can be experienced. Effective LCMs provide short, as well as long term, control of whole fluid losses under such conditions. Significant amounts of resilient LCM can often be needed to isolate a high-loss zone. Such large amounts can have significant financial costs.

An effective LCM can have a high resilience. That is, the LCM can return to its original shape after being subjected to a load. In other words, an effective LCM should be ductile and malleable with good conformal characteristics to adapt to various sizes according to the dimensions of any pores or fractures. An effective LCM can also have adequate chemical resistance to wellbore fluids. Rubber can meet these criteria.

The automobile industry generates a large amount of scrap tires each year, globally. Scrap tires can be difficult to recycle and can cause environmental hazards if not disposed of properly. For example, scrap tire piles can be a serious source of fire, resulting in health and environmental hazards due to the release of smoke and toxic gases. Such piles are also breeding places for rodents and mosquitoes that may cause outbreaks of various diseases.

This disclosure describes a new LCM for sealing high-loss zones in a wellbore and a method for making the LCM from scrap tires. To seal high-loss zones, the LCM is pumped into a wellbore with a drilling fluid under high pressure. The pressure is great enough to force the LCM particles to lodge themselves into pores and fractures located within the wall of the wellbore while the LCM particles are in a compressed state. Once the pressure is removed, the LCM particles expand and permanently seal the fractures. The LCM is manufactured by collecting and shredding used tires, for example, automobile tires. While this application refers to automobile tires, tires from motorcycles, trucks, trailers, tractors, airplanes or any other vehicle with tires could be used as a tire source just as well. The tires are shredded, fibers and wiring are removed, and the tires are further ground down to the desired particle size.

FIG. 1 is a flowchart showing an example method 100 that can be utilized with aspects of this disclosure. At 102, an automobile tire that is unsuitable to carry an automobile is obtained. For example, the tire can include an unrepairable puncture, the tire can include worn tread, or the tire could have any other defect that prevents it from being used on an automobile. After obtaining the automobile tire, the obtained automobile tire can be cleaned to remove contaminants and impurities. Cleaning can include washing the tires with detergents, degreasers, or any other known cleaning method. In some implementations the scrap tires can be rinsed with water and scrubbed. In some implementations, the scrap tires can be cleaned with an air-blowing method, a hot water wash, or a combination of the two. In implementations where an air-blowing method is used, a high-pressure air-line blows contaminants off of the surface of the scrap tires.

At 104, tire pieces, around one-hundred to one-thousand millimeters (mm) in size, are formed from the obtained automobile tire. Forming the tire pieces can include shredding the cleaned automobile tire to form tire chips. In some implementations, the tires can be shredded with an industrial scrap tire shredding machine, such as a two-shaft shredder or a four-shaft shearing-type shredder. In some implementations, the tire pieces can be further granulated into tire chips. In some implementations, at least some of the tire pieces are larger than at least some of the tire chips. That is, the tire pieces are further refined by reducing their size into tire chips. The refined tire chips can range in size from 250 microns to 5 millimeters. Any suitable grinding system capable of producing the desired tire chip size can be used. Granulating the tire chips can include removing steel bands and fiber from the automobile tire. The steel can be removed magnetically, with shaking screens, through centrifugal separation, through gravity separation, or any other separation method. The fiber can be removed using shaking screens, wind sifters, or any other filter method. The final refined product can be utilized as LCM for drilling operations.

At 106, the tire chips are mixed with a quantity of wellbore carrier fluid to form a mixture. For example, the quantity of wellbore carrier fluid can include water, bentonite, soda ash, sodium hydroxide, or any other wellbore fluid additive. The amount of LCM that can be added to the drilling fluid can range from five parts per billion (mass) to fifty parts per billion (mass) without adversely affecting the pumping of the drilling fluid. In some implementations, the LCM can have a negligible effect on the weight of the drilling fluid less than thirty pounds of LCM for every barrel of fluid. In some implementations, LCM can be neutrally buoyant. The LCM is able to stay suspended within the drilling fluid, at least partially, due to the turbulent flow within the wellbore.

At 108, the mixture of fluid and tire chips are used as loss circulation material during a wellbore drilling operation. Using the mixture as loss circulation material during the wellbore drilling operation can include flowing the mixture into a wellbore being drilled during the wellbore drilling operation. The tire chips are capable of at least partially sealing loss circulation zones in a formation in which the wellbore is being drilled. That is, the LCM particles (or chips) can become lodged within the fissures and pores in the wall of the wellbore and at least partially block the fluid flow from the wellbore into the geologic formation. The LCM mixture can be continuously circulated in the wellbore, or it can be launched in bulk using a pill. The LCM mixture can be circulated until the high-loss zone has been sufficiently mitigated to continue drilling operations. Once the pressure is removed from the wellbore, the LCM particles can remain in place and continue to at least partially prevent fluid from flowing into the high-loss zone of the geologic formation from the reservoir. The LCM particles stay in place by expanding back to an original size after a pressure within the wellbore is reduced. The expanded LCM particles then become lodged in any pores and fractures in which they are located. Details on the amount of expansion and pressure are explained in detail later within this disclosure.

Detailed tests of certain LCM were carried out in a laboratory setting. In some examples, the tire-based LCM discussed within this disclosure is compared to commercially available products. The tests are discussed in further detail in the examples below.

Experimental Set-Up

The qualitative assessment of bulk compressibility and the ability of the resilient waste tire particles to squeeze through gap sizes equal to half of the sizes of the resilient waste tire particles were done under 500 pounds per square inch gauge (psig) pressure. For this test, a two millimeter slotted disc was used to simulate a two millimeter fracture size. Bentonite fluid was used as the carrier fluid to test the ability of squeezing 2 mm tire particles through 1 mm slots of the gap simulating disc used in the test. Immediately after applying 500 psig pressure, all bentonite fluid along with the 2 mm tire particles squeezed through the 1 mm slots of the disc progressively. This demonstrates the bulk compressibility of the waste tire particles at 500 psi squeezing pressure to pass through slot sizes smaller than the size of the resilient tire particles.

The ability of the scrap tire particles to shrink under the action of pressure and expand back toward the original size after the withdrawal of pressure or absence of any pressure demonstrates its springing or rebounding characteristics and thus indicates its suitability as a viable alternative to commercial resilient LCM products. Such results are demonstrated later within this disclosure. This resilient character of the tire particles ensures that these particles will respond appropriately in changing differential pressures, in situ stresses, tectonic activities, operational conditions for effective control of the loss of whole fluid while drilling and cementing. The great elastic, ductile, and resilient property of the tire particles allow immediate adjustment of the size to make a tight fit in the gaps and fractures and prevent the popping or expulsion from the gaps and fractures. The flexible physio-mechanical properties of scrap tire-based resilient LCM with excellent elasticity, bulk compressibility, conformities, and rebounding properties allow them to adjust shape and size easily to fill up rock-pores and fractures of variable sizes.

The strain energy method, that is, measuring the maximum energy absorbed during the applied load and the maximum energy released after the withdrawal of the applied load, was used to calculate the resilient coefficient.

An appropriate amount of scrap tire particles was used to produce a cylindrical sample of 4.5 centimeters (cm) in height within a cylindrical test cell of 4.4 cm diameter. After placing scrap tire particles in the test cell, it was shaken and vibrated manually to compact the particle and form a cylindrical sample of 4.5 cm height in the test cell. A load frame with an operating software was used to compress the sample to various percentages of strain and determine the load required to strain, the absorbed strain energy during loading, and the released strain energy during unloading, and then calculate the resilient coefficient of the materials. A loading rate of 0.5 mm/second was used during loading and unloading stage of the tests.

Experimental Results

Figure 2A:
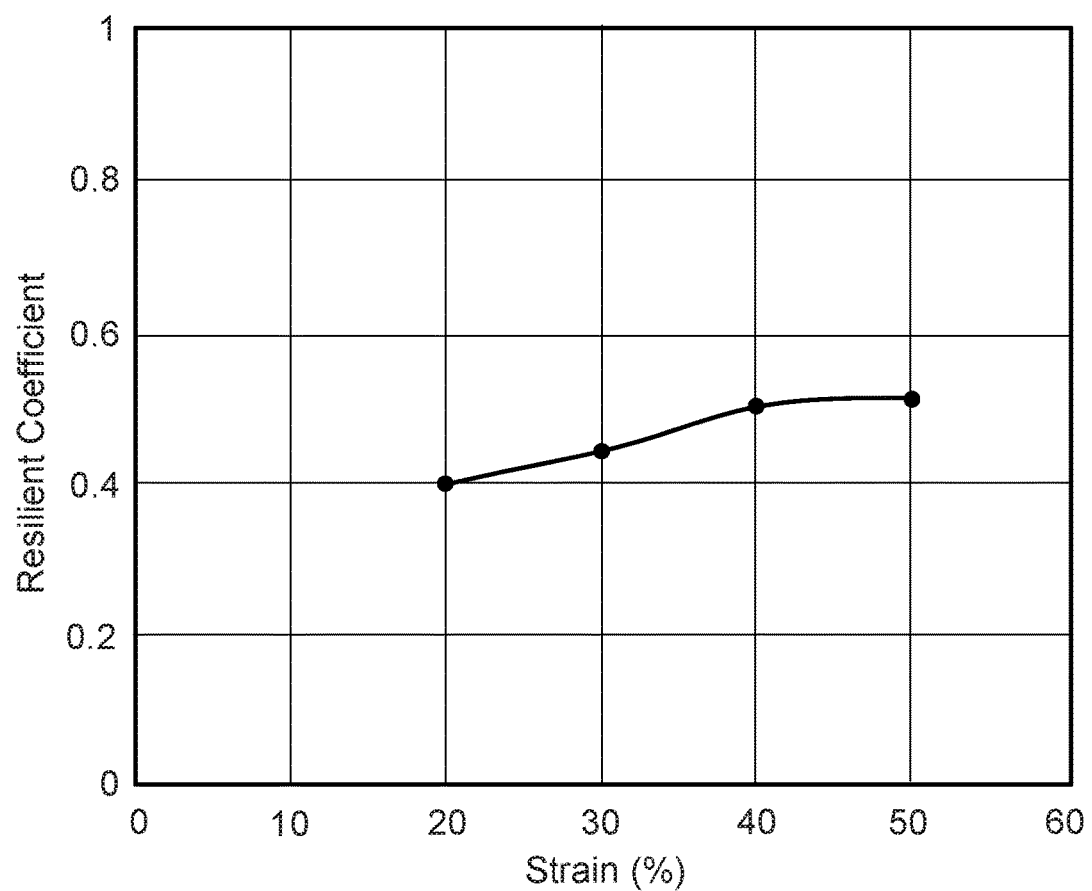
FIG. 2A is a plot showing resiliency over strain resulting from a test utilizing the testing apparatus.
Figure 2B:
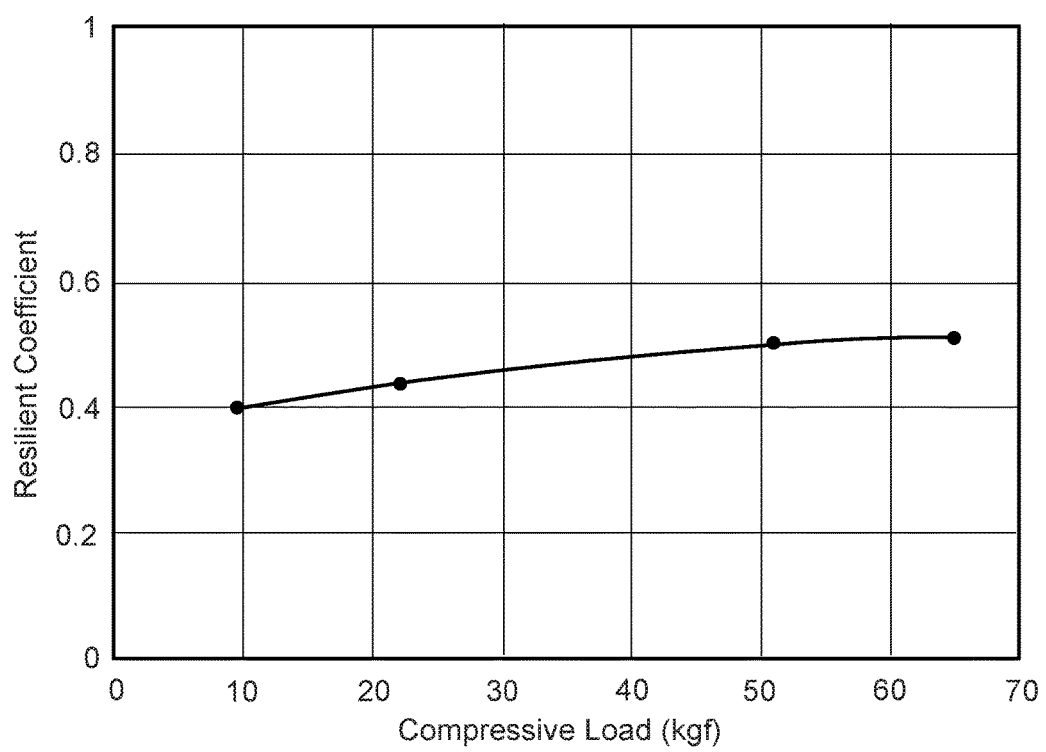
FIG. 2B is a plot showing resiliency over load resulting from a test utilizing the testing apparatus.

FIG. 2A shows the resilient coefficient (y-axis) of the tire particles as a function of percentage strain (x-axis) of the tire particles The data indicates resilient behavior of the waste tire particles with various percentages of strain ranging from 20 to 50 percent. The data further indicates that the resilient behavior of waste scrap tire-based LCM increases with increasing strain percentages. The significance of this observation is that the particles will absorb greater strain energy with increasing percentage of strain and will also release greater amounts of strain energy when the load acting on it is removed. Hence, the seal and plugs formed in a loss zone at greater squeezing or bull-heading pressure will maintain the sealing and plugging capacity by desorbing greater amounts of strain energy when the squeezing or bull-heading pressure is withdrawn. Comparitively, graphite-based commercial resilient LCM showed a resilient coefficient of 47 percent at 10 percent strain of the sample. However, the load required to strain 10 percent is about 60 kilogram force (kgf). This indicates that the commercial resilient LCM has reduced bulk compressibility and thus reduced resilient characteristics. Based on this observation, the scrap tire-based particulate LCM is a viable alternative to commercial resilient LCMs. FIG. 2B shows the resilient coefficient of the tire-base LCM as a function of applied compressive load used to compress the waste tire particles using a force that is below the elastic limit. The data clearly indicate excellent resilient behavior of the waste tire particles even under 10 kgf compressive load. The data further indicate that the resilient behavior of waste scrap tire-based LCM increases with increasing compressive load. The drilling engineering significance of this observation is that the particles will be able to squeeze into smaller and smaller gaps with increasing squeezing or bull-heading pressure but will rebound towards their original size if there is a decrease in in-situ stress and pressure, provided the pressure and stress do not exceed the elastic limit of the material. FIG. 2B shows about 40 percent resilient coefficient of the scrap tire-based product even at 10 kgf compressive load and about 50 percent resilient coefficient at about 60 kgf compressive load. Comparatively, the commercial resilient LCM showed about 47 percent resilient coefficient at about 60 kgf compressive load for 10 percent straining of the sample. This indicates that the tire-based LCM is a better and viable alternative to other commercial resilient LCM products to control loss of circulation while drilling. Hence, the scrap tire-based resilient LCMs can be used as an alternative to commercial resilient LCMs to design resilient seals and plugs forming pills or loss control slurries.

Figure 3:
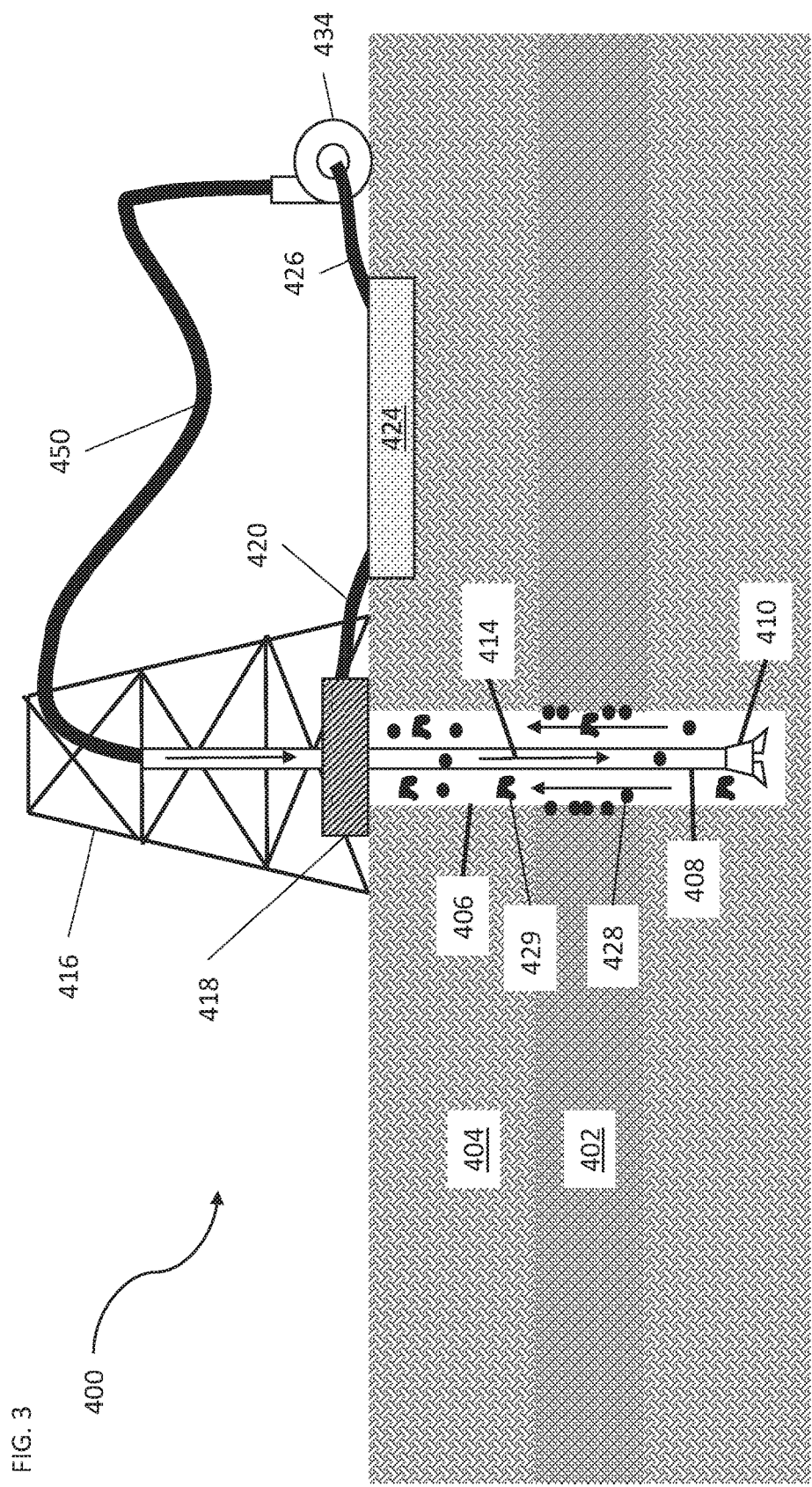
FIG. 3 is a side cross sectional view of an example wellbore being drilled through a high-loss zone.

FIG. 3 shows a side view and a top view of an example well drilling system 400 drilling through a high-loss zone 402 located within the geologic formation 404 in accordance with some implementations from the present disclosure. As illustrated, the well circulation system includes a drill derrick 416 that supports the weight of a drill string 408 through a blowout preventer and a well head 418 of a wellbore 406. The drill derrick 416 can also selectively position the drill string 408 within the wellbore 406. The drill string 408 has a down-hole end connected to a drill bit 410 that drills the wellbore 406 in the formation 404. To facilitate drilling and removal of wellbore cuttings 429, a circulation pump 434 circulates the drilling fluid 414 though the wellbore 406. An inlet of a circulation pump 434 is connected to a mud pit 424 through a first pipe 426 and a discharge of the circulation pump 434 is connected to a top end of the drill string 408 through a second pipe 450. The blowout preventer 418 is connected to the screen 422 and the shaker table 421 through a third pipe 420. The mud pit 424 is connected to the screen 422 and the shaker table 421 and receives the circulation fluid 414.

As previously mentioned, the circulation fluid 414 is capable of circulating tire-based LCM particles 428. During circulation, the fluid 414 is pumped from the mud pit 424 and flows through the first pipe 426 into the suction of the circulation pump 434. The circulation pump 434 then pumps the fluid 414 from the discharge to the top end of the drill string through the second pipe 450. The drill string passes through the well head and the blowout preventer 418 and enters the wellbore 406 through the drill bit 410. After exiting the drill bit 410, the fluid 414 and LCM particles 428 flow through the wellbore annulus toward the well head while carrying cuttings 429 and the LCM particles 428. The fluid 114 can be circulated at an increased pressure to allow the LCM particles 428 to flow into the pores and fissures located in the high-loss section 402 of the wellbore 406 as the fluid 414 flows through the annulus. The increased pressure is sufficient to push the LCM particles 428 into the high-loss zone 402. The LCM particles 428 can expand once the annular pressure is removed in order to remain lodged within the pores and fissures within the high-loss zone 402. The fluid 414 and excess LCM particles 428 flow through the blowout preventer 418 to the mud pit 424. In some implementations, the mud pit 424 can include a screen or shaker table to remove the cuttings 429 from the fluid 414. The excess LCM particles 428 can be recirculated until the high-loss zone 402 is sufficiently plugged to continue drilling operations. While the illustrated implementation shows a vertical wellbore, the principles of this disclosure can also be applied to a deviated or horizontal wellbore as well.

Thus, particular implementations of the subject matter have been described. Other implementations are within the scope of the following claims.

The invention claimed is:

1. A method comprising:
 flowing a mixture of tire chips and wellbore carrier fluid into a wellbore being drilled at a first pressure, wherein the tire chips are compressed by the first pressure; and
 flowing the mixture at a second pressure, less than the first pressure, wherein the tire chips expand in response to the second pressure, wherein tire chips at least partially seals loss circulation zones in a formation in which the wellbore is being drilled after the tire chips have expanded, wherein the mixture comprises between five parts per billion to fifty parts per billion of loss circulation media.

2. The method of claim 1, wherein the wellbore carrier fluid comprises water, bentonite, soda ash, or sodium hydroxide.

3. The method of claim 1, further comprising, obtaining a used vehicle tire and cleaning the obtained used vehicle tire.

4. The method of claim 3, further comprising forming the tire chips, wherein forming the tire chips comprises shredding the cleaned used vehicle tire to form a plurality of tire pieces, wherein at least some of the plurality of tire pieces are larger than at least some of the tire chips.

5. The method of claim 4, further comprising granulating the plurality of tire pieces into the tire chips.

6. The method of claim 5, wherein granulating the tire chips comprises removing steel and fiber in the used vehicle tire.

7. The method of claim 6, wherein the steel is removed magnetically.

8. The method of claim 6, wherein the fiber is removed using a combination of shaking screens and wind sifters.

9. The method of claim 1, wherein the tire chips range in size between 250 microns and 5 millimeters.

* * * * *